United States Patent [19]

Edmunds

[11] 4,209,281
[45] Jun. 24, 1980

[54] WIND DRIVEN PRIME MOVER

[76] Inventor: William A. Edmunds, 2975 Pheasant Run Dr., Jackson, Mich. 49202

[21] Appl. No.: 926,329

[22] Filed: Jul. 20, 1978

[51] Int. Cl.² .............................................. F03D 3/06
[52] U.S. Cl. ............................ 416/197 A; 416/231 B
[58] Field of Search ............... 416/197 R, 197 A, 119, 416/231 B

[56] References Cited

U.S. PATENT DOCUMENTS

| 2,324,759 | 7/1943 | Brassell | 416/194 |
| 3,704,009 | 11/1972 | Kalbskopf | 416/197 A X |
| 4,015,911 | 4/1977 | Darvishian | 416/197 A X |
| 4,037,989 | 7/1977 | Huther | 416/197 A |

FOREIGN PATENT DOCUMENTS

| 330928 | 12/1920 | Fed. Rep. of Germany | 416/197 A |
| 324937 | 4/1903 | France | 416/232 |
| 494018 | 8/1919 | France | 416/197 A |
| 535218 | 4/1922 | France | 416/197 A |
| 111334 | 1/1945 | Sweden | 416/197 A |

Primary Examiner—Everette A. Powell, Jr.
Attorney, Agent, or Firm—B. P. Fishburne, Jr.

[57] ABSTRACT

A vertical axis wind driven prime mover has plural circumferentially spaced horizontal wind driven arms carried by a central hub which is attached to a central vertical axis rotational working shaft. Each wind driven arm carries multiple fixed blades or louvers which can extend horizontally or vertically on the arms. The louvers of each arm are constructed and arranged to act as impulse elements when the arm is moving with the wind on one side of the vertical axis machine and to form reaction motive elements when moving against the wind on the opposite side of the vertical axis machine. Each arm of the prime mover additionally includes fixed wind confining or pocketing members along its leading and trailing horizontal extremities at both the top and bottom thereof and at its inner and outer ends. Each arm carries a fixed angular vertical flange at its outer end to propel the arm in the proper direction when the arm is aligned with the direction of the wind. The wind can drive the assemblage of arms in only one direction with the rotational working shaft and the prime mover is essentially unitary without relatively moving parts in the assembled device. Structural simplicity and operational efficiency are achieved in a practical machine. The prime mover can also operate in a denser fluid medium, such as water.

7 Claims, 12 Drawing Figures

WIND DIRECTION →

FIG.8

← WIND DIRECTION

WIND DRIVEN PRIME MOVER

BACKGROUND OF THE INVENTION

Wind driven machines have been known for centuries as a means for performing useful work, the windmills of Holland being perhaps the most notable example of utilization of wind energy for machine operation. In the past, there has been severe limitation on the development of wind driven prime movers and one of the prime limitations has been that of size, particularly in connection with the traditional horizontal rotational axis mill or machine. Another factor inhibiting the development of wind driven machines has been fragility and the inability of the machines to withstand severe storms without destruction. Other recognized problems which need not be enumerated herein have, until recently, slowed the development of wind machines nearly to a standstill.

Notwithstanding the above, the current worldwide recognition of dwindling conventional energy resources have rekindled an active interest in the development of wind driven machines with the result that quite a number of new machine configurations have come into being, at least on an experimental basis and have exhibited some improvement over the traditional prior art in terms of operational efficiency. For the most part, however, recent efforts toward advancing the art have adhered to the basic approaches used in the past with certain refinements based on recent knowledge and technology. Therefore, most of the hinderances to complete practicality extending in the past continue to exist, such as practical limitation in the size and weight of rotor arms, the necessity for too many moving parts and cyclic controls, particularly in the case of vertical axis wind machines whose rotors must simultaneously move with the wind and against the wind. The traditional horizontal axis windmill utilizing propeller-like wind driven blades is severely limited in terms of the size and weight of such blades and supporting means, as well as the fact that such a machine can only respond to winds moving in one prevailing direction. On the other hand, the advantage of the traditional horizontal axis (Dutch) windmill compared to the vertical axis machine is simplicity of construction without need for many moving parts or cyclic controls to activate wind capturing devices on one side of the vertical rotational axis while collapsing such devices on the far side of the rotational axis which moves against the wind.

For the above reasons and many others, neither the horizontal axis nor vertical axis wind driven machine has been completely practical or widely utilized except on a limited scale up to the present time, despite the recognized and urgent need for sources of energy which can at least supplement conventional sources at the present time, and also supplement the more exotic and costly energy sources of the future, which are already on the horizon, including solar and nuclear energy.

To comply with the duty to disclose known prior art under 37 C.F.R. 1.56, the following prior United States patents of some relevancy to the invention herein are made of record in this application:

2,003; 346,797; 615,782; 794,706; 1,092,458; 1,126,069; 1,539,157; 1,714,808; 1,914,426; 2,094,603; 2,518,611; 2,707,521; 3,565,546; 3,897,170; 3,920,354; 3,930,750; 3,995,170; 4,004,861; 4,039,849; 4,047,833; 4,047,834.

SUMMARY OF THE INVENTION

The invention is embodied in a wind driven prime mover which is far ore practical than known prior art devices, more efficient and comparatively more economical to build. Perhaps the greatest advantage of the invention is the fact that its various components are fixed relative to one another and the only movement is the movement of the unitary rotor assembly with the vertical axis rotational shaft which it drives.

Because the rotor structure is much less delicate and fragile than in prior art machines, it is possible to construct the prime mover in sizes well beyond practical size capabilities of the prior art. The size and strength capabilities of the invention enable it to perform useful work of much greater magnitude than has been possible in the past utilizing wind power alone. It is believed that the total effective louver area or working area in a practical embodiment of the invention may equal or exceed the total sail area of the largest square rigger sailing ships ever constructed. On this basis, it is expected that the power generating capability of the largest practical single unit of the invention would be measured in megawatts. It follows that the invention could supply a significant portion of the world's power needs if developed to the utmost. In this connection, the wind powered prime mover would be installed in the most advantageous locations, such as on mountains, and atop very high towers, to take maximum advantage of wind power. The units could be constructed in clusters or "farms" to realize the fullest potential of the invention.

The construction of the prime mover is such that it is propelled in one direction of rotation regardless of wind direction. The arrangement of fixed blades or louvers in the wind driven arms causes the device to function as an impulse turbine when the arms are moving with the wind and to function as a reaction turbine when moving against the wind, after the rotor has attained a substantial speed of rotation. A suitable governor means can be employed to prevent run-away speeds of the rotor due to the combined impulse and reaction forces acting on it, and also be prevent the outer tips of the rotor arms from reaching the speed of sound. The hub of the rotor can also be fitted with a hydraulic disc brake for holding the rotor stationary during maintenance or repair.

Another important feature of the prime mover is the arrangement of the rotor shaft bearings relative to the very large radially projecting wind driven arms carrying horizontal or vertical arrays of the combined impulse-reaction type louvers. The geometry of the device in this connection affords maximum stability at both high and low speeds of rotation as well as smooth operation for transmitting torque through the vertical axis shaft which is always maintained under load.

The louvers and other rotor components can also be equipped with state of the art de-icing means as employed in aircraft.

Another very important aspect of the invention is the provision on both the leading and trailing sides of each rotor arm of efficient wind capturing and pocketing means whereby the wind will be directed properly against the lourvers for deriving the maximum energy from the wind. Inasmuch as the natural wind is an unconfined elastic fluid moving from a high pressure area to a lower pressure area, but at any given point containing substantially no pressure within itself, but only velocity, the wind can only be subtly guided, not forced. This is entirely different and present different problems for utilization of wind energy as compared to steam or other fluids which are confined under regulated pressure in pipes or the like and can be directed through nozzles onto the blades of rotating work machines. The present invention has for one of its important features the proper construction to make the fullest and most efficient utilization of the unconfined wind.

The invention possesses additional features and advantages which will be apparent during the course of the following detailed description.

It should be noted that in power generating applications the operational speed of the rotor will be governed for synchronous operation, 60 Hz. Additionally, a state of the art governor through suitable linkage can cause pivoting and feathering of the rotor louvers to allow the freest possible passage of wind therethrough so as to prevent damage or destruction during storms. It is thought that the prime mover with a rotor constructed primarily of aluminum could successfully withstand hurricane force winds. Except for the emergency feathering of lourvers, the rotor parts are fixed and without relative movement during the operation of the device.

DETAILED DESCRIPTION

Figure 1:
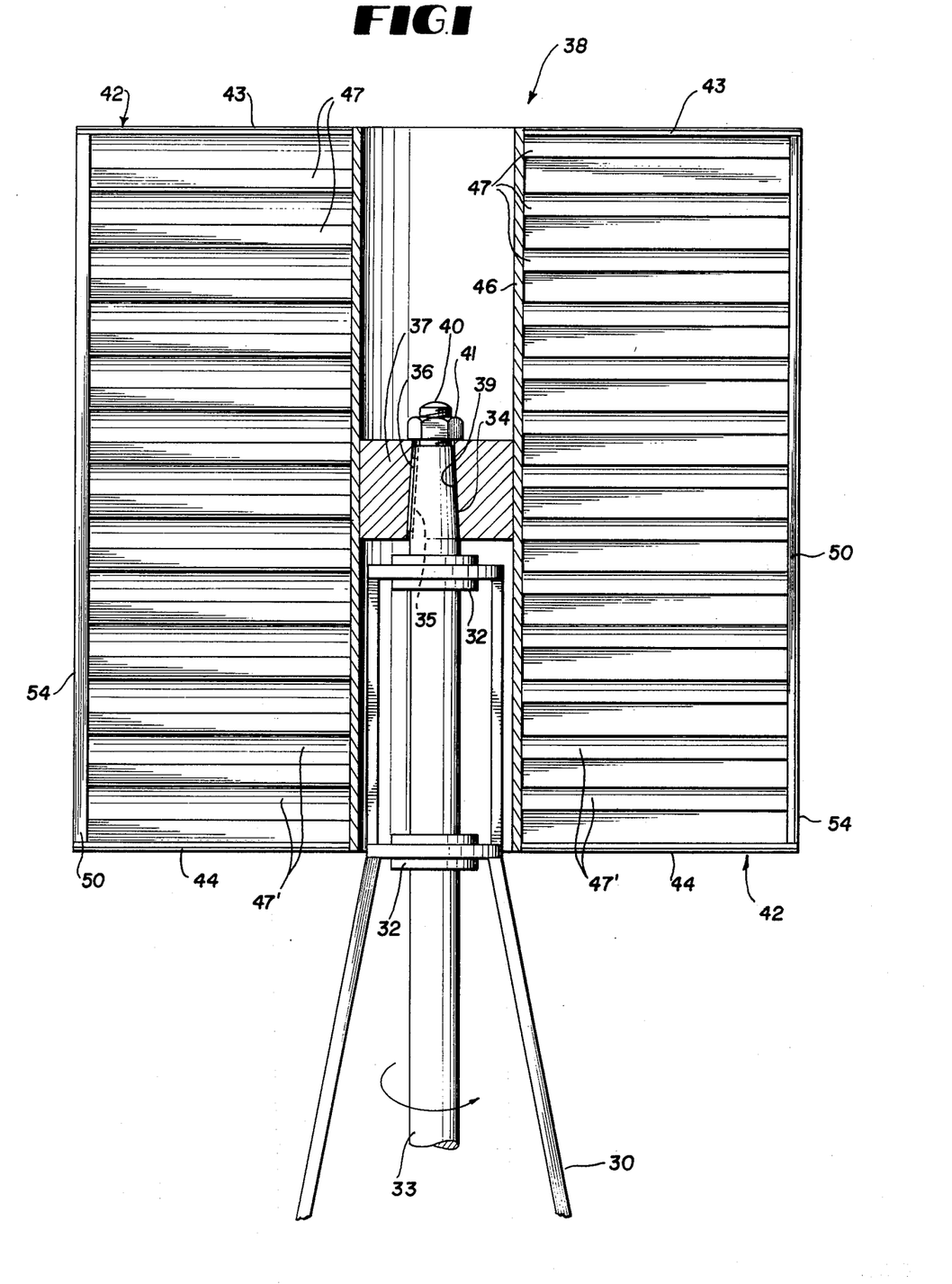
FIG. 1 is a partly schematic side elevation of a wind driven prime mover in accordance with the invention.
Figure 2:
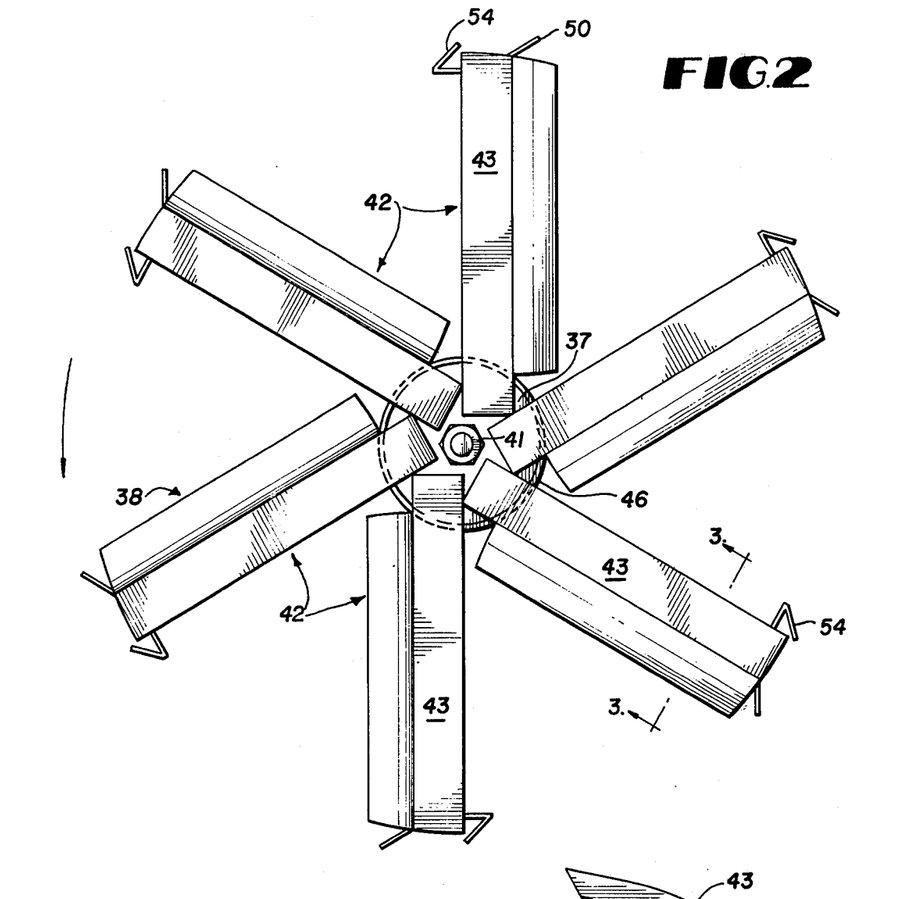
FIG. 2 is a partly schematic plan view of the same.

Referring to the drawings in detail wherein like numerals designate like parts, reference is made first to FIGS. 1 and 2 showing a wind driven vertical rotational axis prime mover which is mounted atop a tall tower at any advantageous location such as on a mountain top. The extreme upper portion only of the support tower is indicated in FIG. 1 by the numeral 30. The details of construction of the tower are unimportant and may vary. The tower 30 has a top extension 31 which supports widely spaced coaxial bearings 32 which in practice may be spaced apart as much as thirty to fifty feet. These bearings support rotationally a vertical axis working shaft 33 of the necessary diameter and length which may be connected at a lower elevation to any suitable load. Like the propeller shaft of a ship, the upper end portion of the shaft 33 above the top bearing 32 is tapered at 34 and provided with a keyway 35 receiving a key 36 also engaging in a matching keyway formed in a hub 37 of wind driven rotor 38 whose structure, to be described in detail, forms the main subject matter of the invention. The hub 37 has a tapered bore 39 matching and receiving the tapered shaft extension 34. The top extremity of shaft 33 is threaded as at 40 and receives thereon a nut 41 firmly securing the rotor hub assembled with the rotational shaft 33.

As further illustrated in FIG. 2, the rotor 38 which is formed as a unit without relatively moving parts consists of a plurality, preferably at least six, of circumferentially equidistantly spaced radial wind driven arms 42 which are identical in size and configuration. Each arm 42 extends for substantial and preferably equal distances above and below the hub 37 and is rigidly secured to the hub to turn therewith. In practice, the vertical heights of the arms 42 may measure as much as one hundred feet although dimensions may be varied considerably depending upon environmental factors and work needs. Each arm 42 may have a radial width of as much as fifty feet, more or less. The only true limitations on the sizes of the arms 42 and rotor are the strength of the tower supporting the rotor, practical diameter for the shaft 33, strength and stability of the rotor arms and their number on the rotor, which should be six or more. A further limitation is that the tips of arms 42 must not reach the speed of sound.

The rotor arms 42 are optionally equipped with horizontal or vertical fixed louvers. Horizontal louvers possess certain operational advantages over vertical louvers and are therefore preferred, although either type is feasible in the prime mover. FIGS. 1 through 8 of the drawings illustrate the preferred embodiment of the invention where horizontal louvers are utilized and the remaining drawing figures show vertically extending louvers.

Referring to FIGS. 1 through 8 primarily, each rotor arm 42 consists of a top and bottom blade or wing 43 and 44 tapered to a sharp leading edge 45 for minimal wind resistance. The wings 43 and 44 and all of the horizontal louvers above and below the hub 37 have their inner ends fixed to a vertical axis cylinder 46, which in turn is fixed to the hub 37. This cylinder effectively closes the interior ends of the rotor arms 42 so that captured wind will not escape inwardly radially above and below the hub 37 during operation.

In some instances where the arms 42 are of lesser heights, the axial length of the hub 37 may be increased to support all of the louvers and the cylinder 46 which amounts to extensions of the hubs may be omitted.

Figure 3:
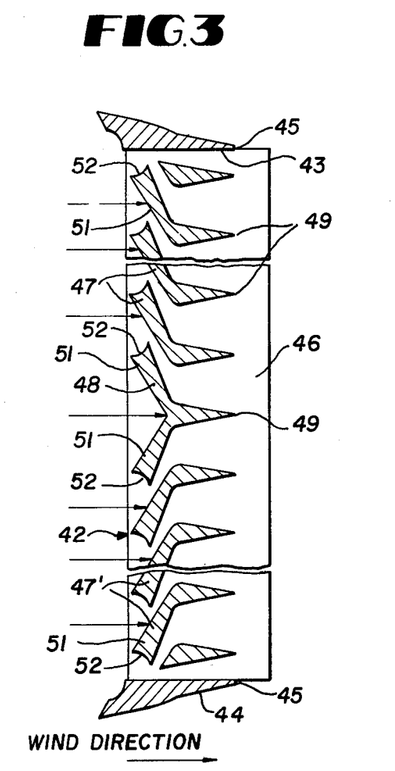
FIG. 3 is an enlarged vertical section through one of the rotor arms of the prime mover taken on line 3—3 of FIG. 2 and showing louvers extending horizontally in the rotor arms, the rotor arm and louvers moving with the wind.
Figure 4:
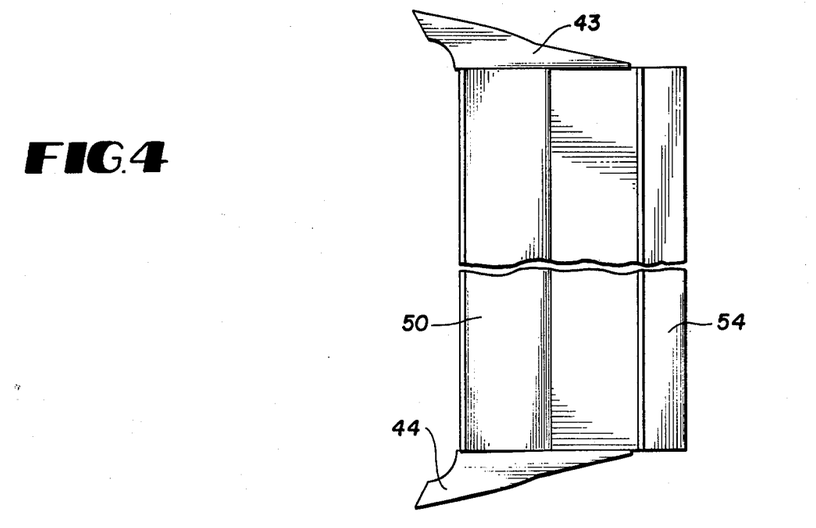
FIG. 4 is an end elevational view of one of the rotor arms.
Figure 5:
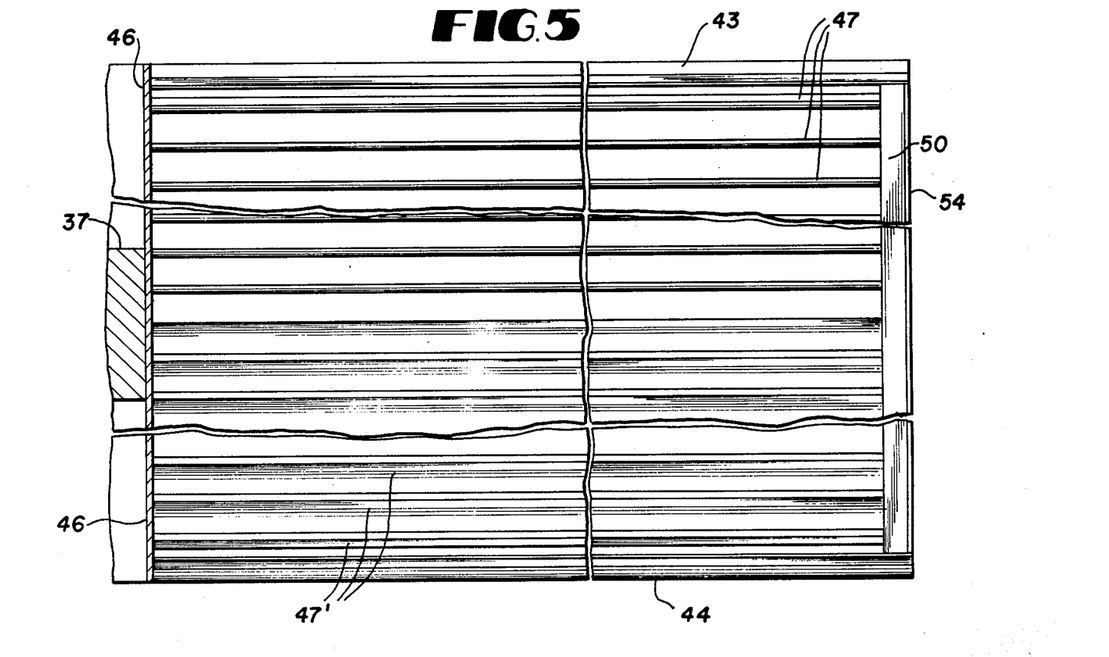
FIG. 5 is a rear side elevational view of a rotor arm.

Each rotor arm 42 comprises an upper group of fixed louvers 47 and a lower group 47', FIG. 3, the two groups being intervened by a single divider louver 48 common to both groups. The numbers of louvers 47 and 47' may be varied according to the size of the rotor arms 42. While the louvers 47 and 47' are identically shaped, their positions are reversed vertically in the two groups, as shown in FIG. 3. The louvers are equidistantly spaced with their leading sharp edges 49 in vertical alignment and their trailing ends in alignment. The louvers 47 and 47' are generally L-shaped.

The outer ends of all of the louvers in each arm 42 are rigidly secured to vertical spars 50 which interconnect the wings 43 and 44 rigidly to complete a marginal frame around each rotor arm 42. The spars 50 form closure elements preventing the escape of wind radially outwardly from the rotor arms during operation.

Another feature of the rotor arm construction is that the wings 43 and 44, the cylinder 46 and spars 50 extend somewhat fore and aft of the louvers in each arm to form fore and aft wind capturing and directing means immediately forwardly and immediately rearwardly of the louvers 47, 47' and 48. Since wind is an unconfined pressureless fluid, it requires directing or guiding toward the louvers in order that the latter may react most completely and efficiently to its forces. Therefore, the described wind pocketing and directing means on the front and rear side of each rotor arm is essential to the most efficient operation of the prime mover. It is also essential to have the closure elements 46 and 50 at the ends of the louvers to properly confine and direct the wind.

A very important aspect of the invention resides in the action of the fixed louvers of each wind-driven arm 42 during the rotational cycle of operation of the prime mover. As shown particularly in FIG. 3, where the arm 42 and louvers are moving with the wind whose direction is indicated by the arrows, the wind impinges on the rear inclined faces 51 of the louvers to initiate and maintain unidirectional rotation of the rotor 38. As the arm 42 begins to move with the wind, the wind will also impinge on curved pockets 52 of the several louvers to further assist in propelling the rotor as an impulse machine and these pockets will redirect the wind and prevent it from escaping through the passages between the louvers to enhance the impulse mode of operation which will continue for each arm 42 until such arm rotates sufficiently about the vertical axis of the machine to begin moving against the wind, as graphically illustrated in FIG. 6. It will be understood that each oncoming arm 42 moving with the wind is driven initially by impulse forces as described above and shown in FIG. 3.

Figure 6:
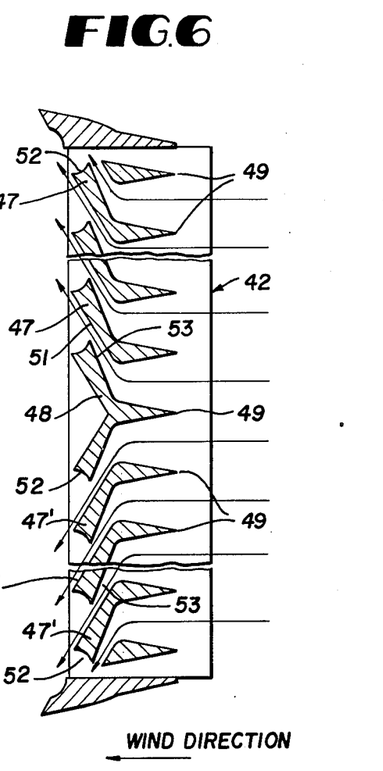
FIG. 6 is a view similar to FIG. 3 with the rotor arm and lourvers moving against the wind, the wind being graphically represented by arrows in FIGS. 3 and 6.

As each rotor arm 42 begins moving into or against the wind, its sharp leading edges 49 will cut through the wind with minimum resistance and the wind graphically represented by the arrows in FIG. 6 will flow through the several constricted passages 53 between adjacent louvers to exit behind the louvers whose rearward faces are now defined by the pockets 52. When the wind flows through the restricted passages 53 between louvers, its velocity is greatly increased under a well known physical phenomenon and the high velocity wind exiting the restricted passages 53 will exert a reactive force on the rotor arm 42 which is cumulative or the summation of all of the reactive forces generated by the passage of wind through the several passages 53. This total reaction force drives each arm 42 against the wind simultaneously with the impulse force driving of the rotor arms with the wind on the other side of the vertical rotational axis of the machine. This combined mode of operation will propel the rotor 38 of the prime mover with great efficiency even in comparatively light winds and always in the proper direction of rotation. In connection with the described reaction force mode of operation shown in FIG. 6, it should be stated that the reaction mode does not become substantially effective until the wind driven rotor achieves a substantial speed of rotation. Prior to reaching such speed, it will be propelled primarily by impulse forces with the louvers on the other side of the rotor axis causing only minimal resistance to movement due to their configurations.

However, once the rotor develops sufficient rotational speed, the combined impulse-reaction mode of operation becomes fully effective and if the wind is fairly constant in its velocity, the rotor 38 will quickly achieve great and increasing rotational speed in the manner of a turbine. As previously noted, the working shaft 33 will always be connected with a load to prevent run-away and the machine can be governed by conventional means and/or the louvers can be feathered in severe storms by conventional means. In normal operation, however, the louvers are fixed and the rotor is without relatively moving parts which is a great advantage over the prior art.

It should also be noted that the restricted flow passages 53 or slots are continuous along the lengths of the horizontal louvers of each rotor arm 42.

In addition to the described impulse and reaction phases of operation of the rotor 38, there is an important third coacting aspect of the cycle of operation which assists in proper start-up of the rotor in the correct direction of rotation and further assistance in its continuing propulsion by the wind. This third phase of the operation is achieved by the provision on the tips of the several arms 42 of approximately 45 degree angle blades 54 which are parallel to the vertical axis of shaft 33. As shown in FIG. 2, the blades 54 are angled to move into the wind with minimum resistance and to pocket the wind acting on the rear sides of the blades. The primary function of the tip blades 54 is to assure proper directional rotation of the rotor 38 whenever an arm 42 is directly in line radially with the direction of wind flow, that is to say, in a neutral position which is neither with or against the wind. The total construction of the rotor 38 is such that it is continuously propelled in one direction of rotation by the wind from any of the possible directions on the compass from which the wind may be flowing. The resultant forces of the wind on the rotor produce constant unidirectional rotation at all times.

By way of summarizing at this point, it has been demonstrated that each of the circumferentially spaced rotor arms 42 has effective wind capturing and confining means on its forward and rear sides for directing the captured wind into the louvers most effectively to produce the unique impulse-reaction drive for the prime mover, as described above in detail, along with the supplemental driving and directional controlling action of the tip blades 54.

Figure 7:
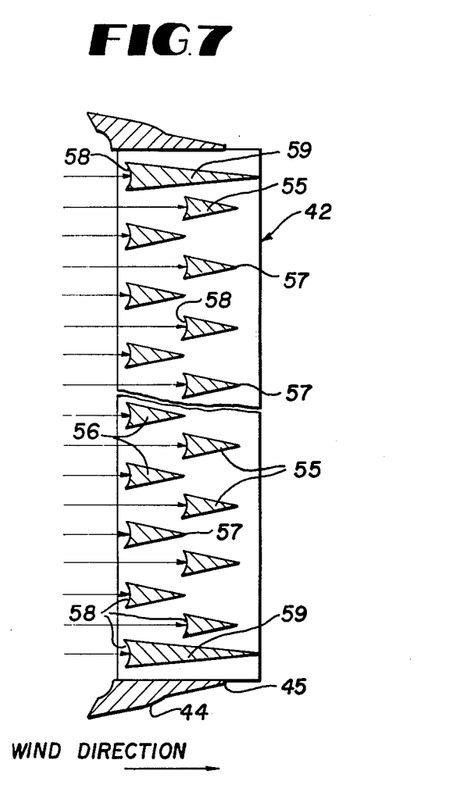
FIG. 7 is a further view similar to FIG. 3 showing a modified arrangement of horizontal louvers moving with the wind.
Figure 8:
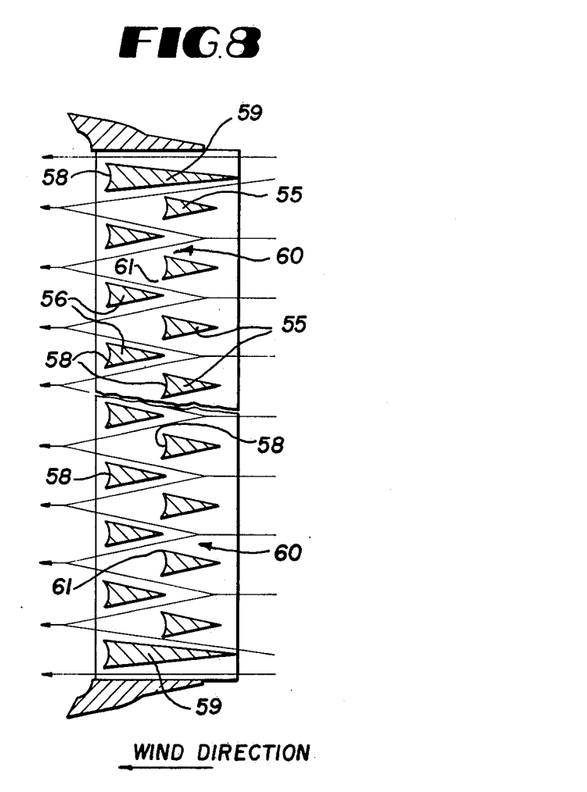
FIG. 8 is a view similar to FIG. 6 showing the louvers of FIG. 7 moving against the wind.

FIGS. 7 and 8 schematically depict a modified arrangement of horizontal louvers on the rotor arms 42 in lieu of the arrangement shown in FIGS. 3 and 6. As shown in these figures, the horizontal fixed louvers are disposed in two discrete arrays or banks vertically with the louvers 55 in the leading bank staggered vertically from the louvers 56 in the trailing bank of louvers. The louvers 55 and 56 are configured like wedges which are symmetrical about the horizontal longitudinal axes of the louvers. They have sharp leading horizontal edges 57 and rear arcuate impulse pockets 58 to capture the wind flowing in the direction of the arrows, FIG. 7. At the top and bottom of the two banks of horizontal louvers, a single pair of elongated wedge louvers 59 is provided, having leading edges which extend beyond the other louvers to capture the wind. When the rotor arm 42 is moving with the wind, FIG. 7, the wind impinges on the pockets 58 and drives the vertical axis rotor by impulse forces. The staggering of the two banks of louvers prevents the wind from passing through the rotor arm 42 substantially.

When the rotor arm 42 is traveling against the wind, FIG. 8, the wedge-like louvers split the wind with minimum resistance and the wind is funneled through primary tapering passages 60 between the louvers 55 where its velocity is increased, and then the wind is split by the louvers 56 and funneled through further restricted passages 61 where again itse velocity is increased. These two sequential wind velocity increases add up to a substantial resultant reactive force on the rotor arm 42 moving against the wind after the speed of the vertical axis rotor becomes sufficiently great to render the reactive force effective, as was explained in the prior embodiment. The general mode of operation remains unchanged for either of the two types of horizontal fixed louvers shown in FIGS. 3 and 6 and FIGS. 7 and 8. With respect to FIGS. 7 and 8, all other parts of the invention, not shown, remain unchanged and are in accordance with the previous embodiment.

Figure 9:
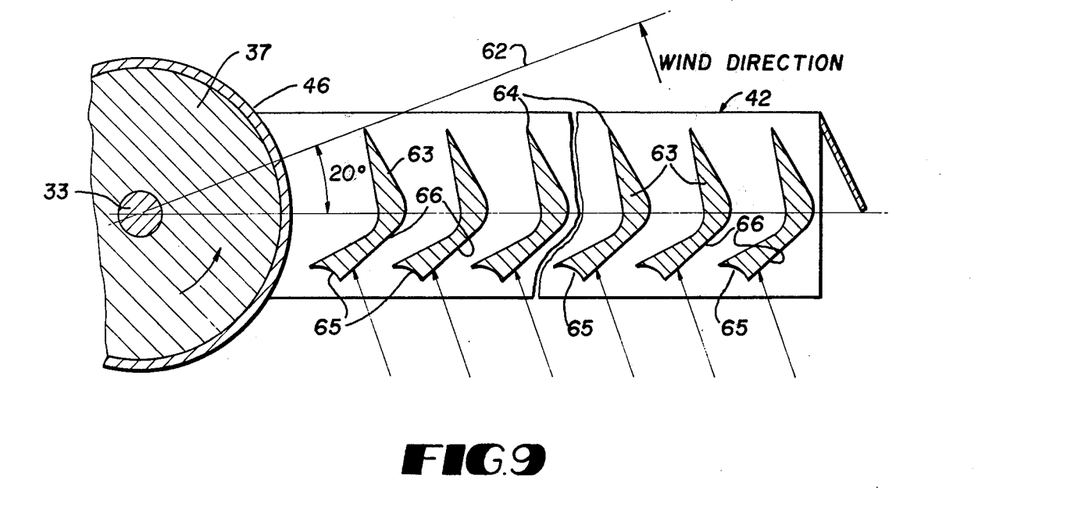
FIG. 9 is a partly schematic plan view of a rotor arm having vertically extending louvers moving with the wind according to a modification of the invention.
Figure 10:
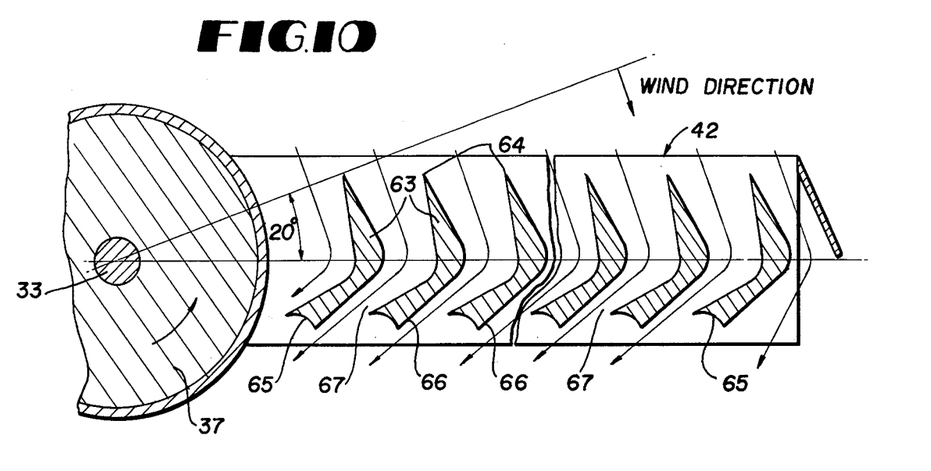
FIG. 10 is a similar view showing the rotor arm in FIG. 9 moving against the wind.

FIGS. 9 and 10 show a modification of the invention in which the fixed louvers of the rotor arms 42 extend vertically and parallel to the axis of the shaft 33 rather than horizontally. The radial axis of each rotor arm 42 is disposed at an acute angle, preferably about 20 degrees, forwardly of a plane 62 perpendicular to the wind direction. Preferably at least six rotor arms 42 are employed as in the initially described embodiment, FIG. 2.

The vertical fixed louvers 63 may be profiled substantially like the louvers 47 and 47', and they are generally L-shaped with tapered leading sections terminating in sharp vertical edges 64. At their rear ends, FIG. 9, the louvers 63 have continuous arcuate vertical pockets 65 similar to the pockets 52 and for the same purpose, namely, for confining and redirecting the wind when the rotor arm is moving with the wind as shown by the arrows in FIG. 9. The wind will impinge initially on the angled faces 66 of all of the louvers to drive the rotor arms by impulse forces and as soon as forward rotation of the arm 42 commences, the wind will impinge on the pockets 65 to continue the impulse mode and the pockets redirect the wind and prevent it from passing through the arm substantially. The vertical louvers 63 extend continuously from top to bottom of the individual radial rotor arms 42 as the arms are depicted in FIG. 1. Each arm having the vertical louvers 63 also has the previously-described wind capturing and directing means on its forward and rear sides formed by the wings 43 and 44 and the cylinder 46 and spars 50 above and below the rotor hub 37. In one respect, the horizontal arrangement of louvers in FIGS. 3 and 6 and 7 and 8 is preferred over vertical arrangements because in the latter the interior one or two vertical louvers 63 near the hub 37 and cylinder 46 are not as effective as the other louvers radially outward thereof on each arm of the rotor. This is true because the air passing through the louvers 63 when they are moving against the wind, FIG. 10, has some tendency to be trapped by the cylinder 46 and rotor hub as it moves inwardly, thus reducing to a small degree the total reaction effect on the rotor arm 42, FIG. 10. In the case of horizontal louvers, whether of the type in FIG. 3 or FIG. 7, there is no comparable trapping of wind near the vertical axis hub 37 or vertical cylinder 46, FIG. 1, when the rotor is moving against the wind and the wind flowing through the horizontal louvers can flow generally parallel to the vertical axis of the rotor 38 in an unimpeded manner both close to the hub and the cylinder or radially outwardly therefrom so that the horizontal louvers near the hub and shaft 33 are just as effective in driving the rotor by reaction as are the portions of the louvers further out from the hub and near the spars 50. Nevertheless, the vertically disposed louvers of FIGS. 9 through 12 are completely operational and possess substantially the same advantages over the known prior art as the horizontal louvers and the difference in efficiency in the two types of louvers is merely a matter of degree.

FIG. 10 shows the vertical louvers of FIG. 9 moving against the wind on the other side of the vertical shaft 33. The sharp edges 64 split the wind designated by the arrows with minimum resistance. The impulse faces 66 and pockets 65 are not functional at this time. The wind is forced to flow through restricted passages 67 between adjacent louvers, resulting in increased velocity of flow where the wind exits the louvers, thus producing a reaction force on the arm 42 which is a summation of the reaction forces from the several high velocity wind streams flowing from the passages 67. As in the prior embodiment of the invention, once the rotor reaches an optimum speed, the reaction force on the arms 42 moving against the wind will supplement the impulse force on the arms 42 moving with the wind to propel the rotor of the prime mover with great efficiency and without the need for troublesome moving parts. It is this particular feature which renders the device so much more practical in terms of sturdiness and durability even under severe weather conditions than the comparable prior art.

Figure 11:
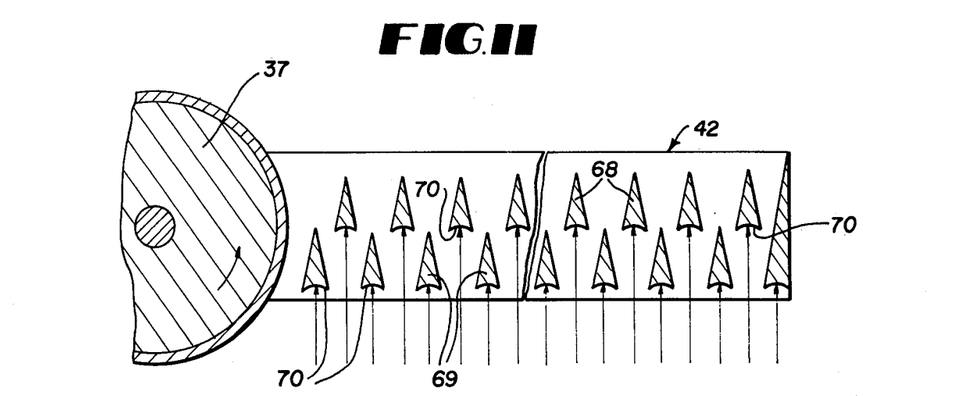
FIG. 11 is a further partly schematic plan view of a rotor arm having a modified arrangement of vertical lourvers and moving with the wind.
Figure 12:
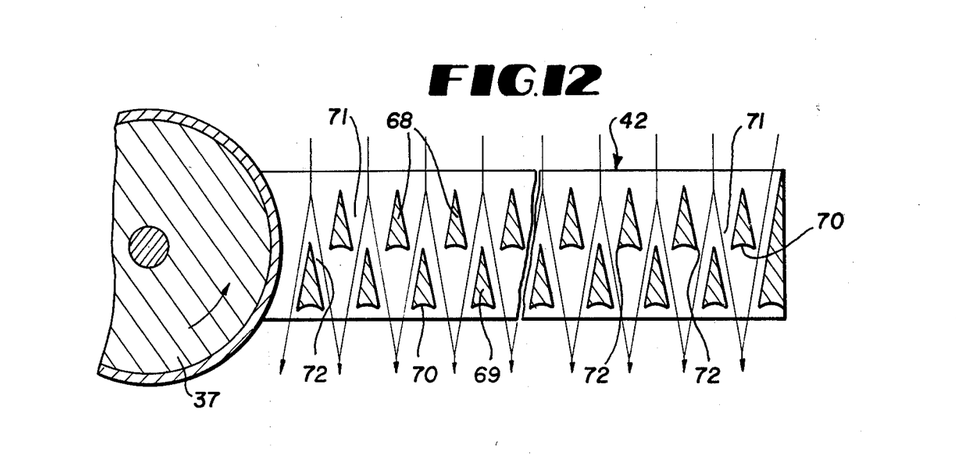
FIG. 12 is a similar view showing the rotor arm in FIG. 11 moving against the wind.

FIGS. 11 and 12 show a modified arrangement of vertical louvers for each rotor arm 42 which is comparable to the horizontal louver arrangement of FIGS. 7 and 8. The vertical louvers in FIGS. 11 and 12 are disposed in tandem laterally offset rows which extend radially of the hub 37. Forward wedge-like louvers 68 are arranged midway between rearward louvers 69 of the same shape. The impulse pockets 70 of all of the vertical louvers catch the wind for impulse driving of the arm 42 and prevent substantially the through passage of wind as described in connection with FIG. 7.

When the arm 42 is moving against the wind, FIG. 12, the wedge-shaped louvers split the wind with little resistance and the wind velocity is greatly increased in restricted passages 71 and 72 in the same manner which was described previously in connection with FIG. 8 to produce a strong reactive force on the arm 42 which actually propels it against the wind. As in all of the previous embodiments, each rotor arm 42 is equipped with the forward and reverse side wind capturing and guiding means as well as the angled tip 54.

While this invention has been described and illustrated as a wind-driven machine, it is desired to emphasize that it also finds utility as a prime mover driven by a more dense fluid such as water, and the appended claims are intended to cover the structure operated in or by any fluid medium.

It is to be understood that the form of the invention herewith shown and described is to be taken as a preferred example of the same, and that various changes in the shape, size and arrangement of parts may be resorted to, without departing from the spirit of the invention or scope of the subjoined claims.

I claim:

1. In a fluid driven prime mover, a vertical axis rotary working shaft and support means for said shaft, a driving rotor coupled to said working shaft and having plural circumferentially spaced rotor arms disposed in substantially vertical planes, said arms radiating from said shaft, and banks of fixed louvers on said arms of the rotor and being rigidly connected with the arms, the fixed louvers of each rotor arm being disposed in a common plane and extending substantially entirely across the arm in one direction and being parallel to each other in such direction, and each louver in the bank of louvers on each rotor arm comprising an approximately L-shaped louver body having an intermediate elbow portion, a leading tapered portion extending from the elbow portion and terminating in a substantially sharp frontal edge positioned along the flow path of a fluid medium by means of which the prime mover is being driven, a trailing portion extending from the elbow portion at an oblique angle to the flow path of said fluid medium and having opposite side faces which diverge away from the elbow portion so that the trailing portion increases in thickness rearwardly, each trailing portion being provided at its rear end with a concave impulse face positioned to be impinged on by a flowing fluid medium, and the opposing side faces of all of the divergent trailing portions of said louver bodies being rearwardly convergent to define between adjacent louver bodies a plurality of equal width rearwardly tapering restricted venturi slots across each rotor arm, said slots being coextensive lengthwise with said louver bodies and said venturi slots disposed immediately forwardly of said concave impulse faces and somewhat rearwardly of the elbow portions, the axes of said venturi slots being oblique in relation to the flow path of said fluid medium and being generally normal to said concave impulse faces.

2. In a fluid driven prime mover as defined in claim 1, and parallel blade means extending along opposite sides of each rotor arm for capturing motive fluid and directing it inwardly toward the trailing ends of said louvers.

3. In a fluid driven prime mover as defined in claim 1, and said fixed louvers of each arm being disposed vertically in parallel relationship to said working shaft.

4. In a fluid driven prime mover as defined in claim 1, and said fixed louvers of each arm being disposed horizontally and across the axis of said working shaft.

5. In a fluid driven prime mover as defined in claim 1, and each radiating rotor arm being vertically elongated, a common hub member for said rotor arms rigidly attached thereto substantially midway between their upper and lower ends, and a cylindrical tubular member surrounding and fixed to said hub and extending above and below the hub and in surrounding relationship to a portion of said working shaft, said cylindrical tubular member forming a common closure for the interior side of each rotor arm and being vertically coextensive with said rotor arms and rigidly attached thereto.

6. In a fluid driven prime mover as defined in claim 5, and said rotor arms being configured as rectangles of equal sizes so that the rotor arms will possess equal sail areas.

7. A prime mover adapted to be driven in rotation by the energy of a motive fluid having a flow path comprising a support, a vertical axis rotational working shaft on the support, an essentially unitary driving rotor fixed to said working shaft, said rotor comprising plural circumferentially spaced radiating rotor arms lying in vertical planes and being fixed in relation to one another and in relation to said working shaft, and a series of fixed parallel equidistantly spaced impulse and reaction louvers on each rotor arm and lying in a common plane thereon and extending substantially entirely across each rotor arm in one direction, each louver on each rotor arm being approximately L-shaped including a sharp blade-like leading edge and a trailing concave end face, the placement of the louvers on each rotor arm being such that rear end portions of the fixed louvers overlap in shingled formation and converge to form continuous longitudinal rearwardly opening venturi slots between adjacent louvers on each rotor arm with the axes of the venturi slots obliquely arranged in relation to said motive fluid flow path, the leading end portions of the louvers rearwardly of said bladelike leading edges being divergent for the purpose of funneling and directing motive fluid into and through said venturi slots to derive working energy from the motive fluid by reaction forces when said rotor arms are moving against said motive fluid on said flow path, said motive fluid acting on said trailing concave end faces of the fixed louvers with impulse forces to drive said rotor arms when the latter are moving with said motive fluid on said flow path.

* * * * *